(12) United States Patent
Gilmore

(10) Patent No.: US 6,866,757 B2
(45) Date of Patent: Mar. 15, 2005

(54) ELECTROCOAGULATION REACTION CHAMBER AND METHOD

(76) Inventor: F. William Gilmore, 1433 Pine Ridge La., Castle Rock, CO (US) 80104

( * ) Notice: Subject to any disclaimer, the term of this patent is extended or adjusted under 35 U.S.C. 154(b) by 191 days.

(21) Appl. No.: 10/268,645

(22) Filed: Oct. 10, 2002

(65) Prior Publication Data

US 2003/0070919 A1 Apr. 17, 2003

Related U.S. Application Data

(60) Provisional application No. 60/329,259, filed on Oct. 12, 2001.

(51) Int. Cl.[7] .................................................. C25B 9/00
(52) U.S. Cl. ...................................................... 204/269
(58) Field of Search .............................. 204/267–270, 204/253–258, 297.1

(56) References Cited

U.S. PATENT DOCUMENTS

| | | | | |
|---|---|---|---|---|
| 1,541,947 A | | 6/1925 | Hartman et al. ............ 204/268 |
| 4,124,480 A | * | 11/1978 | Stevenson ................... 204/268 |
| 4,589,968 A | * | 5/1986 | Toomey, Jr. ................ 204/257 |
| 4,891,117 A | * | 1/1990 | Gardner Sr. ................ 204/253 |
| 5,006,215 A | * | 4/1991 | Borrione et al. ............ 204/253 |

* cited by examiner

Primary Examiner—Donald R. Valentine
(74) Attorney, Agent, or Firm—Kyle W. Rost

(57) ABSTRACT

Dielectric rails (112) support an electrode stack (109) that is compressed between end pressure plates (118). The stack is composed of a dielectric spacer (46, 103) forming a central spacer opening, separating a pair of electrode plates (101, 102) that each have a different configuration of openings. A first electrode plate (101) of the pair has a central aperture, while the second electrode plate (102) of the pair has peripheral apertures. A compression device such as a hydraulic cylinder (124) compresses the stack, sliding the plates and spacers together to form a pressure-tight reaction chamber (108). When the cylinder is released, any plate or spacer is readily removed from the stack for replacement or maintenance merely by lifting it off the rails. An electric potential can be applied to each electrode plate at a connecting ear (116), which may be a one of the rail guides (116).

7 Claims, 11 Drawing Sheets

ELECTROCOAGULATION REACTION CHAMBER AND METHOD

CROSS-REFERENCE TO RELATED APPLICATIONS

Applicant claims the benefit of U.S. Provisional Patent Application Ser. No. 60/329259 filed Oct. 12, 2001.

TECHNICAL FIELD

The invention generally relates elements used in electrical and wave energy chemistry. More specifically, the invention relates to electrolytic apparatus composed of electrodes with an electrode supporting means consisting of a dielectric gasket or spacer. In a further aspect, the invention relates to an electrolytic apparatus and method that employ parallel plate electrodes to form plural separate treatment chambers or zones, with a feeding or withdrawing means providing a flow of liquid to be treated to the cells.

BACKGROUND ART

The practice of electrolysis upon aqueous solution results in production of water and an agglomerate. The latter can be separated from the water to produce a clean water. This process and its chemistry are well known, and many types of apparatus are used in the practice of it.

A primary problem in using an electrolytic process to produce clean water is a generally high cost of treatment. The direct cost of electricity is a significant part of the overall cost. The amount of electricity used in electrolytic processing is variable according to many factors in the design of an electrolytic reaction chamber. Design features that reduce electrical consumption are beneficial.

The cost of maintaining electrodes is another part of overall cost. Electrodes are consumed by the electrolytic reaction, but their consumption is basic to the chemistry of the reaction and is expected to occur over a predetermined time that is a function of reaction conditions. However, electrodes also can be fouled or short-circuited by deposit of reaction products. A fouled electrode becomes prematurely inefficient and can add to the amount of electricity consumed. Also, it will wear unevenly and will require premature replacement or removal for cleaning, either of which adds to maintenance cost and down-time for the reaction chamber. A reaction chamber that keeps its electrodes clean during electrolytic processing is beneficial.

A reaction chamber is designed to accommodate many aspects of the electrolytic process. Primarily, the chamber must be effective and efficient in its performance. Thus, such aspects as electrode composition, spacing, and surface area are considered. Sustainable spacing between electrodes is important, so that adjacent electrodes do not contact each other and thereby produce a short circuit. The flow path through the electrodes is a significant factor, as the length of the path influences the speed with which the reaction must be performed and, thus, influences the electrical requirements of the chamber. Ease of replacing electrodes is significant, both in terms of maintenance cost and the down-time of a reaction chamber. These are only a few of the considerations that influence design of reaction chamber, which is a complex process.

One desirable configuration for a reaction chambers is known as the "filter press" design. Electrode plates are interleaved with dielectric spacers and gaskets to form an electrode stack. The stack is capped at its opposite ends by end plates, which are clamped together by suitable bolts or the like. The bolts are tightened to clamp the end plates, in turn squeezing together the elements in the stack of electrodes, gaskets and spacers. The filter press design is desirable because the stack of electrode plates is a unit that is easy to handle. Further, the spacing between plates is well controlled. The end plates can be configured for connection to inlet and outlet conduits for feeding and removing a process liquid, and the electrode plates can be suitably apertured or otherwise configured to define a flow path between the electrodes in the stack. A filter press design lends itself to the use of electrode plates having a square or rectangular shape, which is easily fabricated and, therefore, relatively low in cost.

U.S. Pat. No. 1,541,947 to Hartman et al (1922) shows an early attempt at constructing such a filter press style reaction chamber. The electrodes are rectangular plates. Alternate plates are apertured near opposite narrower ends of the rectangle. Notably, two apertures are used at the perforated end of each rectangle. These apertures are transversely oblong, such that a considerable percentage of the perforated end is open for liquid flow from one processing chamber or zone to the next. Thus, the stack of electrodes defines a sinuous, longitudinal flow path from edge-to-edge of the rectangle, with the direction of flow reversing in each successive zone as the process liquid flows through the series of processing zones.

Later advances in chamber design reveal that edge-to-edge sinuous flow across a rectangle is not uniform. Fluid in certain areas between the electrodes will be stagnant, allowing precipitates to foul nearby surfaces of the electrodes. U.S. Pat. No. 4,124,480 to Stevenson discloses this problem in a filter-press design that employs edge-to-edge flow over rectangular plates in a stack. The electrode plates are slotted across the full width of alternating narrow ends to encourage the process liquid to flow over the full width of each electrode plate. However, even passing through a full width slot, the liquid stagnates along the edges of the plates, perhaps because of resistance induced by contact with the gasket or spacer located at such edges. Thus, it appears likely that longitudinal flow over a rectangular plate bounded by a side wall will be non-uniform and will result in fouling of certain areas of the plates.

The Stevenson patent also proposes a filter-press design using an alternate flow pattern with square electrode plates forming square treatment chambers. A first group of electrode plates are apertured at their center. A second group of electrode plates are relatively smaller in size than the first, such that they leave an almost continuous peripheral gap between each of the second group plates and the stack gaskets. In the second group, only the corners of the periphery are engaged between the gaskets and secure the second plates in the stack. The plates of the two groups are arranged in the stack in alternating sequence. The resulting flow path is from the center of a plate in the first group to the periphery of a plate in the second group, and vice versa.

However, it can be readily seen that such center-to-periphery and periphery-to-center flow will be non-uniform when square treatment chambers are used. In a stack of square plates, the shortest flow path, and likely the one with least resistance, is between the center hole of one plate and the midpoint along any of the four edges of a juxtaposed plate. Fouling is likely along the relatively longer flow paths near the corners of all plates in the stack, with resulting uneven wear, poorly predictable process control, higher electricity usage, short circuits, and premature plate replacement or maintenance.

It is evident that circular plates would be no more successful in producing equal length radial flow paths. Fabricating and assembling a stack of circular plates is likely to be more expensive and will not solve the problems of premature fouling. Like square plates, circular plates must be configured with portions that engage the stack gaskets; and they must provide apertures or peripheral gaps that establish a sinuous flow path between plates. A circular shape is little better than a square one in meeting these two requirements. Uneven flow paths or stagnant areas are inevitable results. Circular plates are likely to behave similarly to square plates in suffering prematurely fouled areas.

It would be desirable to overcome the existing fouling problems in reaction chambers of the filter-press design. In particular, it would be desirable to have a chamber design producing predictable wear patterns in which fouling is not a substantial issue. Such a design would enable the reaction chamber to be operated with sustained process efficiency over a predictable interval. Such a predictable interval can be determined by calculating the consumption of the electrodes according to the reaction parameters imposed upon the chamber, rather than by the unpredictable time between loss of efficiency due to fouling. Maintenance or replacement operations can be performed at scheduled intervals, allowing a high degree of confidence that the electrocoagulation process will remain effective and efficient between such service.

Further, it would be desirable to construct an electrocoagulation chamber in such a way that assembly and disassembly required very little time or technical skill. Thus, a chamber should allow streamlined insertion and removal of electrode plates or blades, as well as of spacers.

To achieve the foregoing and other objects and in accordance with the purpose of the present invention, as embodied and broadly described herein, the electrocoagulation chamber and method of this invention may comprise the following.

DISCLOSURE OF INVENTION

Against the described background, it is therefore a general object of the invention to provide an improved structure for an electrocoagulation chamber, allowing rapid and simple assembly or disassembly, such as for maintenance.

Additional objects, advantages and novel features of the invention shall be set forth in part in the description that follows, and in part will become apparent to those skilled in the art upon examination of the following or may be learned by the practice of the invention.

According to the invention, an electrocoagulation reaction chamber is constructed of a supporting frame providing a pair of laterally spaced, longitudinally extending, dielectric rails for supporting an electrode stack. The supporting frame carries first and second end plates. An electrode stack is located intermediate the end plates. The components of the stack include a dielectric spacer that is supported on the rails and provides a central spacer opening. The stack also includes first and second electrode plates that are supported on the rails. The first electrode plate is positioned between the first end plate and the spacer, and said second electrode plate is positioned between the second end plate and the spacer. One of the electrode plates has a central electrode aperture, while the other electrode plate has one or more peripheral apertures. Both of the electrode apertures are smaller in size than the opening in the spacer. A compression device selectively applies or releases a compressive force on the end plates for compressing or releasing the electrode stack. An inlet supplies process liquid into one end of the electrode stack, while an outlet discharges the process liquid from the opposite end of the electrode stack.

The accompanying drawings, which are incorporated in and form a part of the specification, illustrate preferred embodiments of the present invention, and together with the description, serve to explain the principles of the invention. In the drawings:

BEST MODE FOR CARRYING OUT THE INVENTION

Figure 1:
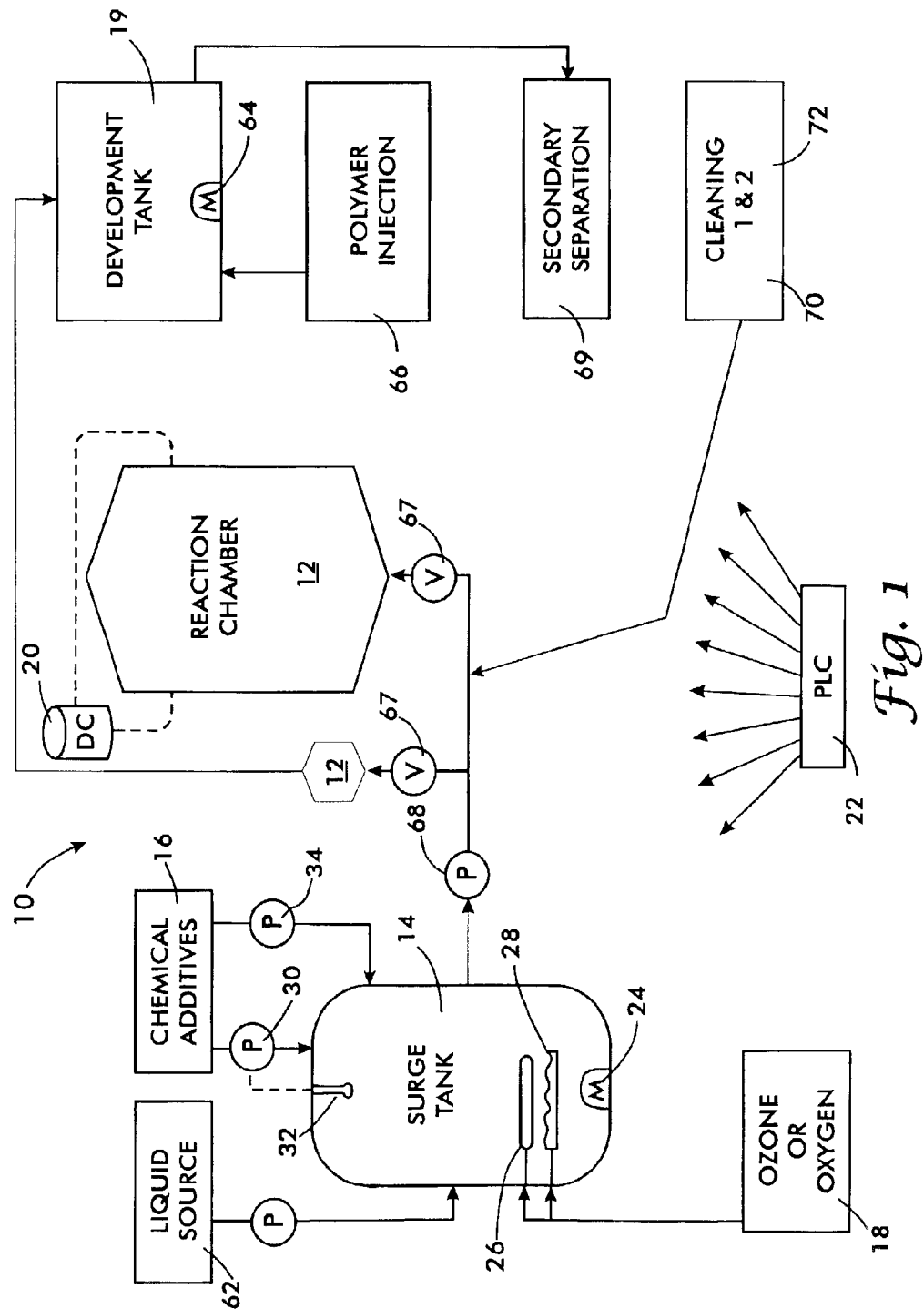
FIG. 1 is a schematic diagram of the overall electrocoagulation process.

The invention provides a non-fouling, self-cleaning, sinuous flow, electrolytic reaction chamber that is easily assembled, disassembled, and maintained. A reaction chamber having a filter press structure is suitable for establishing and maintaining a stack of electrode plates that define a plurality of sequential treatment chambers or processing zones. The filter press style of reaction chamber is suited use in a system for treating water or other process fluids by electrocoagulation. The non-fouling characteristic of the reaction chamber is achieved by creating streamlined flow paths that confine the process liquid to a highly predictable or known flow path through each zone. Thus, in a streamlined flow path, the available surface area of the electrodes is limited to the shape of a predictable or known flow path characterized by a lack of stagnant areas.

The surface areas of the electrode can be conformed to the predictable or known flow path by several methods. First and preferred, the electrode plate is supplied in a size exceeding the size of the known or predictable flow path, and those portions exceeding the flow path are blocked. For example, the electrode plate may be generally square, which is not a desirable shape for a flow path and, therefore, contains surplus area.

The portions of the plate not a part of the predictable or known flow path are blocked from contact with the process liquid. Such blocking may be accomplished by supplying a gasket cut into a configuration that lies over the portion of the plate to be blocked. If a spacer is used in combination with a gasket between juxtaposed plates, the spacer may be cut in the same shape as the gasket so that it will support the gasket against the plate. When a stack of electrode plates, gaskets and spacers are compressed in a filter press style reaction chamber, the gaskets are snugly compressed against the plates, forming a liquid tight seal. The remaining, unblocked surface areas of the electrodes are in contact with the process fluid. Because the unblocked areas bound a known or predicted flow path, the unblocked areas are self-cleaned by the liquid flow.

A second method of conforming the surface area of the electrode to the predictable or known flow path is by providing the electrode plates in the size and configuration of the flow path. For example, a flow path over a plate with apertures located in certain predetermined areas will define a predetermined shape. The electrode plates in a reaction chamber employing such a flow path can be cut in a matching size and predetermined shape, with supporting tabs or an additional edge portion at the periphery, as required to be engaged by gaskets. The gaskets and spacers are shaped to engage only the additional edge portions or supporting tabs of the specially shaped plates.

Empirical testing can determine the shape of flow paths in a reaction chamber. Initially, a reaction chamber employing electrode plates of a standard shape, such as a square, can be operated for a sufficient time to determine where fouling occurs. Such testing should be conducted with plates configured to define apertures in preselected locations and of size and spacing suited for process conditions. The flow paths appear on the plates as clean areas, while areas prone to stagnation or low flow rates will be coated with deposits. The results of empirical testing establish the known or predictable flow paths for the reaction chamber. Thereafter, the gaskets and spacers can be shaped to block the plate areas not lying along the empirically determined flow path.

The invention provides a reaction chamber employing a flow path having a pattern causing the process fluid to clean the exposed electrode surfaces. The reaction chamber is of filter press construction, in which electrodes are arranged in a stack. As assembled in the stack, each electrode has a native geometric shape or outer edge contour that can be chosen for any desired characteristic, such as a physical shape suited to form a leak-proof stack, a shape that is convenient to fabricate and handle, or a shape that otherwise meets a requirement of a particular situation. Plates of regular symmetrical geometric shape relative to a center point tend to be good choices for sealing in a filter press chamber, easy handling, economy of manufacture and shipping, efficiency in utilization, and for forming predictable, regular flow paths. By way of example, such shapes include an equilateral triangle, square, circle, or other regular geometric shape. Elongated variations of these shapes, such as an ellipse, oval, rectangle, or an irregular shape are less desirable but are useable because the flow path ultimately will be determined by other factors, such as the relative positioning of apertures in juxtaposed plates.

A gasket separates each electrode from a juxtaposed electrode in the stack. Each gasket can be shaped at its outer edge to match the outer contour of the electrode plate. Optionally, each pair of juxtaposed electrodes are separated by two or more gaskets, and a spacer of predetermined thickness is interposed between two of the gaskets. The gaskets and spacers are planar and are of similar or substantially the same shape, such as if cut from sheet stock by the same cutting die. The gaskets lie generally over the peripheral margin of each electrode plate and have an open center area, which defines the uncovered central areas of each juxtaposed pair of electrodes. The uncovered area of the electrodes is the active area that contacts process liquid and participates in an electrolytic reaction with the process liquid. The uncovered area between each pair of electrodes constitutes a separate treatment chamber or zone.

A means for establishing an electrical connection to each electrode plate allows each plate to carry a polar charge. For example, an electrically conductive ear may extend from one or more edges of each square plate to beyond the outer edge of the gasket, providing a connection point for an electrical source. Adjacent plates may be oppositely charged by a direct current (DC) electrical source, with the result that each treatment chamber or zone is defined by one positively charged plate and one negatively charged plate.

The electrodes define apertures allowing process liquid to pass from one zone to the next in the stack of electrodes. Each end of the electrode stack is capped by an end plate or pressure plate. The opposite pressure plates are joined together by elongated bolts, threaded rods, or other means for drawing the pressure plates toward each other. The pressure plates compress the electrode stack, primarily by compressing the gaskets to form a leak proof seal against the plates and spacers. The stack of electrode plates, gaskets, spacers and joined pressure plates together defines a reaction chamber. The pressure plates provide inlet and outlet fittings for transmitting process liquid through the reaction chamber. The apertures in the plates provide a flow passage for the process fluid to follow through the reaction chamber.

The apertures through the electrode plates establish a flow path passing sequentially through each of the treatment chambers or zones established between juxtaposed plates in the electrode stack. The flow pattern between sequential apertures is determined by the aperture positions and the configuration of the active or exposed electrode surfaces.

The plates in the stack consist of at least two groups, in which each group is configured with a different aperture pattern from the other group. The plates of the first group, or group one, each define a central and preferably circular aperture, located near the geometric center of the electrode plate. The plates of the second group, or group two, each define a plurality of peripheral apertures, preferably circular or arcuate in shape.

In a plate shaped with corners or distal points, such as a square or triangular plate, an efficient usage of electrode plate area suggests locating one of these peripheral apertures near each of the corners or points of the electrode plate. Thus, in a square electrode plate, four peripheral apertures are used with one in or near each corner of the square.

In a circular plate or other plate without corners or points, the peripheral apertures are located near the peripheral edge of the plate. Preferably the peripheral apertures are equidistant from each other and from the center of the plate.

Plates of the two groups are arranged in alternating sequence in the electrode stack. Each treatment chamber or zone is bounded by one plate having a central aperture and one plate having a plurality of peripheral apertures. The flow path from zone to zone passes sequentially through the alternating hole patterns. Thus, in one of the zones the direction of liquid flow is from the center aperture of a plate from group one, spreading outwardly to the multiple peripheral apertures of a next sequential plate in the stack, which is from group two.

As the fluid enters the next zone, the direction of flow reverses. The flow pattern converges inwardly toward the center of the next sequential plate in the stack, which is from group one. This flow pattern of diverging and converging shape is repeated through the stack of electrode plates. The flow pattern causes turbulent flow of the process liquid, which encourages self-cleaning of the electrodes. The reversal of directions contributes to turbulent flow, which assists in cleaning the electrode plates and improves reaction speed and efficiency.

In almost every situation, the area of the aperture in a group one plate is expected to be unequal to the sum of the areas of the plural apertures in a group two plate. Consequently, the process liquid will undergo changes in velocity as it moves from one treatment chamber to the next. These velocity changes further contribute to turbulent flow.

The configuration of the inner edges of the spacers and gaskets is designed to block stagnant areas or areas of relatively low flow rate, such that the flow rate cannot sustain a clean condition of the electrode surfaces. Empirical testing with circular peripheral apertures shows that the inner edge of the gasket should have an undulated shape, consisting of trough portions and crest portions. The inner edge of the gasket defines a recess or concave trough at each of the peripheral apertures of a group two plate. The trough or recess is centered along the outside edge of one of the peripheral apertures. Thus, the number and positions of the troughs is equal to the number and positions of the peripheral apertures.

The contour of each trough portion tracks the outermost edge of a peripheral aperture up to about one-half the circumference of the aperture. The remaining half of an aperture's circumference is the innermost edge. This edge is open toward the center of the treatment chamber to allow process liquid to flow from the peripheral aperture of a group two plate toward the center aperture of a group one plate.

Neighboring trough portions of the undulated gasket edge are joined by a crest portion. Between troughs, the inner edge of the gasket defines a convex edge or crest centered on the central aperture of a group one plate. The apex of the convex edge typically will be spaced from the edge of the center aperture. A suitable spacing can be determined by the process of empirical testing. Often the crest will be separated from the central aperture by two or more diameters of the central aperture.

With reference to FIG. 1 of the drawings, a system 10 for treating a process liquid by electrocoagulation can employ a filter press style reaction chamber 12 using streamlined flow paths. On the upstream side of the chamber, the system can include a surge tank 14; a means for supplying chemical enhancement additives 16; and an ozone generator or oxygen source 18. On the downstream side of the chamber 12, the system can provide a development tank 19. In addition, the system is powered from a DC power supply 20 and controlled by a programmed processor such as a program logic controller (PLC) 22. In addition, the system may include supplemental standard equipment such as valves (V) and pumps (P) as required.

In a representative system, surge tank 14 holds a minimum of five minutes supply of process liquid, based on the applicable flow rate through the system. The surge tank contains a static mixer 24 for ensuring that any chemical additives 16 are thoroughly mixed with the process liquid. An ozone diffuser 26 or an oxygen micro-bubbler 28 are located near the bottom of the tank.

Chemical enhancement additives 16 commonly are acid or caustic solution for altering the pH of the process liquid. A metering pump 30 is controlled by a pH probe 32 in the surge tank for blending the acid or caustic chemical additives into the process liquid. Other additives can be added by a pump 34 controlled by a timer in the processor.

The ozone generator or oxygen source 18 is used to accelerate the oxidation rate of the electrolytic reaction. It also treats contaminants that may not be adequately treated in the reaction chamber. It is sized according to the flow rate of the system. Oxygen increases the overall oxidation rate of the electrolytic process. When ozone is used in place of oxygen, the rate of the overall oxidation reaction is increased by a factor of about thirteen. However, oxygen is less expensive and adequate for many applications.

With general reference to the FIGS. 1–8 of the drawings, a reaction chamber 12 can be constructed of square electrode blades or plates 100 alternating between group one plates 36 and group two plates 38. The group one plates 36 have an aperture 40 at the center, while the group two plates have peripheral apertures, such as four apertures 42 distributed with one in each corner. The areas of the holes 40,42 are calculated to cause a pressure differential so that the velocity of the process liquid varies and causes turbulent flow as its passes between juxtaposed plates.

The plates are separated by spacers 46 formed of a chemically inert material such a polyvinylchloride. The spacers are selected for their predetermined thickness, which establishes a corresponding gap between the electrodes. A wide variety of spacer thickness can be preselected to accommodate the electrical requirements of the process liquid.

A gasket 48 is located between each plate and spacer for sealing the treatment chambers or zones 50 within the electrode stack. The gaskets and spacers are shaped by their inside edges to define streamlined flow paths in each treatment chamber 50. Gasket material typically is of a durometer in the range from sixty to seventy to produce a liquid tight seal without requiring adhesive. To a small degree, the gaskets influence the gap between electrodes. In addition, gaskets can be chosen with a preselected thickness to change the electrical characteristics of the reaction chamber.

The electrode stack is held in place by opposing pressure plates 52 located at opposite ends of the stack. The plates are equipped with fittings 54 for attaching inlet and outlet conduits to the chamber. The plates 52 are held together and compressed against the electrode stack by suitable compression rods that may include bolts, threaded rods, cam-locking fastener rods and the like. A set of four compression bolts 56 may connect the plates 52 at the four corners of the stack. In addition, another compression means such as a cam-locking fastener 58 may interconnect the plates 52 at the midpoint of each straight side of the stack. The periphery of each electrode plate, gasket and spacer may be apertured to be threaded over the compression rods as an aid to the assembly of the electrode stack.

Each electrode plate 100 carries an electrically conductive ear 60 for receiving a DC electrical connection. The ears extend outside the gaskets on the outer surface of the electrode stack. A guard or cover can be placed over the reaction chamber to prevent inadvertent contact with the ears or any other electrified portion of the reaction chamber. As a safety measure, the guard may be equipped with an interlocking switch for shutting off power to the system when the guard is removed.

The development tank 19 receives treated process liquid under pressure from the reaction chamber 12. The treated liquid resides in tank 19 while floc forms. A static mixer 64 in tank 19 enhances floc development. A polymer injection system 66 can be used where polymers will improve the settling process.

The DC power supply 20 receives alternating current (AC) power from the grid and transforms it to DC through a rectifier. The positive and negative sides of the DC supply are selectively connected to electrode blades in the reaction chamber. The DC supply can switch or reverse polarity to the electrodes. Periodically reversing polarity minimizes any buildup of oxides on the electrodes.

Overall system control resides in the program logic controller 22. Controlled features include liquid flow rate, operation of pumps and valves, and application of power to the reaction chamber electrode plates.

In operation, the system 10 is suited to treat process liquids, which may include waste water, drinking water, or process water. Process liquid is pumped from a source 62 to the surge tank 14 at a specified number of gallons per minute. The surge tank provides flooded suction for a feed pump 68. It also receives chemical additives 16 such as acid or caustic solution to adjust the pH of the process liquid. The static mixer 24 blends the additives and the process liquid. Ozone or oxygen 18 are injected into the process liquid to enhance the normal rate of oxidation that will take place in the reaction chamber 12.

Optionally, polymers can be injected into the liquid in the surge tank to improve the floc structure of certain process streams. For example, when thickening a stream of sewage sludge, five percent of the normal polymer rate improved the resulting solids from seventeen percent to over twenty percent.

The process liquid from the surge tank is pumped under pressure through a connection to one or more reaction chambers 12. Each reaction chamber contains electrode plates formed of selected metals to provide the optimum ions for the appropriate chemical treatment of the process liquid. If multiple reaction chambers 12 are connected to the surge tank, individual reaction chambers can be placed on-line or off-line by suitable valves 67. This allows adjustment for varying flow rates and permits maintenance of individual chambers while processing continues in another chamber. The power supply 20 provides DC current to the electrodes, where the electricity passes through the process liquid and causes chemical reactions tending to form impurities into precipitates and flocs.

The treated process liquid exits the reaction chamber and enters the development tank 19 while still under pressure. A residence time in the development tank allows floc to develop and be separated from the remaining portion of the treated process liquid, which often is clean water. Static mixer 64 in the development tank increases the rate of floc development and increases the efficiency of the polymer injection system 66. Liquid from the development tank can be pumped or gravity fed to a secondary separation system 69 such as a clarifier, filter press, filter, or the like.

Two systems clean the reaction chamber when it is inactive. One system 70 purges the chamber and then cleans it by pumping in acid or caustic solution that removes any build-up of contaminants on the electrode plates. A second system 72 purges the chamber with water to remove contaminants. The chamber is allowed to remain filled with clean water when it is idle. The water prevents oxidation on the electrodes.

Figure 2:
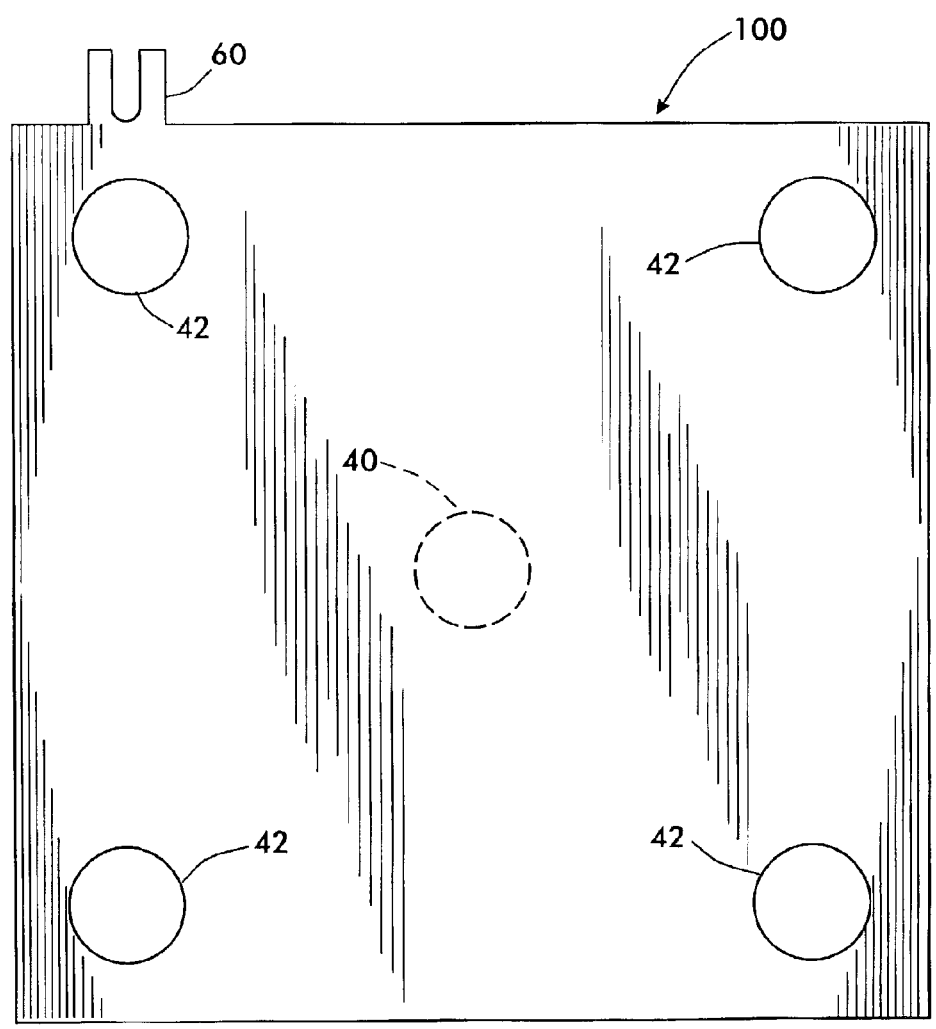
FIG. 2 is top plan view of a single electrode plate, showing the corner apertures in solid border, and showing an alternative central aperture in dashes.

According to one detailed embodiment of the reaction chamber, and with reference to FIG. 2, a square electrode plate 100 has equal sides 30.5 cm (12 in) in length. An electrical connection ear 60 extends from one of the sides at a position near one of the corners. The plate can be configured as either a group one or group two plate, according to the number and position of apertures formed in it. A central aperture 40 is formed through each group one plate. Four corner apertures 42 are formed through each group two plate. The corner apertures are spaced from the edge of the plate by 13.5 mm (0.53 in). Each aperture 40,42 is 19 mm (0.75 in) in radius. With an electrode plate 45.7 cm (18 in) per side, the preferred aperture radius is 2.5 cm (1 in). In an electrode plate 61 cm (24 in) per side, the preferred aperture radius is 3.8 cm (1.5 in).

Figure 3:
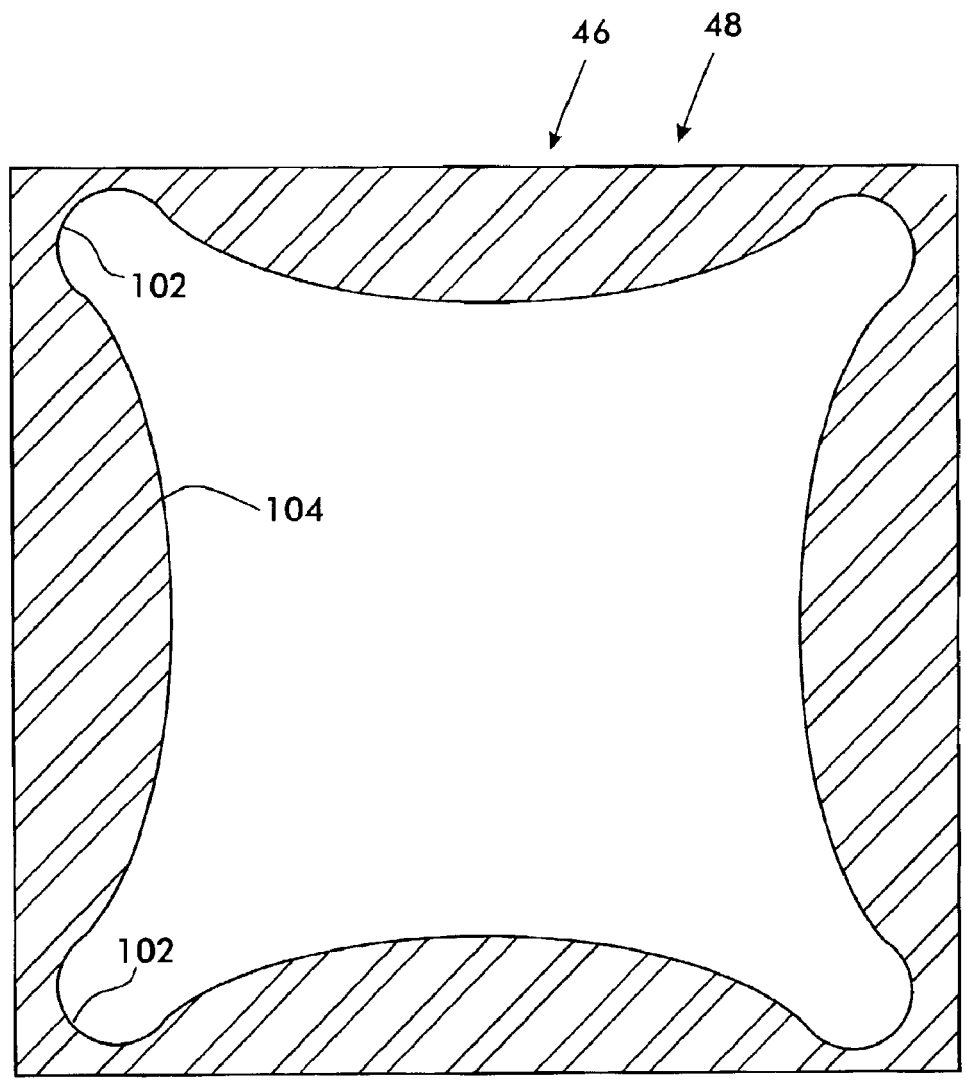
FIG. 3 is a top plan view of a single gasket or spacer.

With reference to FIG. 3, a gasket 48 has a square outer edge 30.5 cm (12 ) per side and is sized to fit over the electrode plate with edges aligned. The inside edge of the gasket is contoured in an undulating pattern. At a position over the corner aperture of the electrode, the gasket is shaped with a trough or recess 102 having a concave curve on a 19 mm (0.75 in) radius. The concave curve is located on the gasket to align with the edge of a corner aperture 42 of a group two plate over approximately the outermost one-half of the circular aperture. In a gasket having 45.7 cm (18 in) side edges, the concave curve has a 2.5 cm (1 in) radius; or with a gasket having 61 cm (24 in) side edges, the curve has a 3.8 cm (1.5 in) radius, or in each case conforming to the radius of the aperture in a mating electrode plate.

The inner edge of the gasket forms a crest or convex curve 104 between concave curves 102. The apex or center point of the crest is spaced 5 cm (2 in) from the outer edge of the gasket. The end of the crest meeting the trough blends smoothly. In a gasket having 45.7 cm (18 in) side edges, the apex of the crest is 7.6 cm (3 in) from the outer edge; or with a gasket having 61 cm (24 in) side edges, the apex of the crest is 10 cm (4 in) from the outer edge. Gaskets typically will be 3.2 mm (0.125 in) in thickness.

Spacers 46 are shaped identically to gaskets 48 but vary in thickness. Suitable spacer thicknesses are 6.4 mm, 9.5 mm, 12.7 mm, 19 mm, and 25.4 mm (1.4 in, ⅜ in, ½ in, ¾ in, and 1 in).

Figure 4:
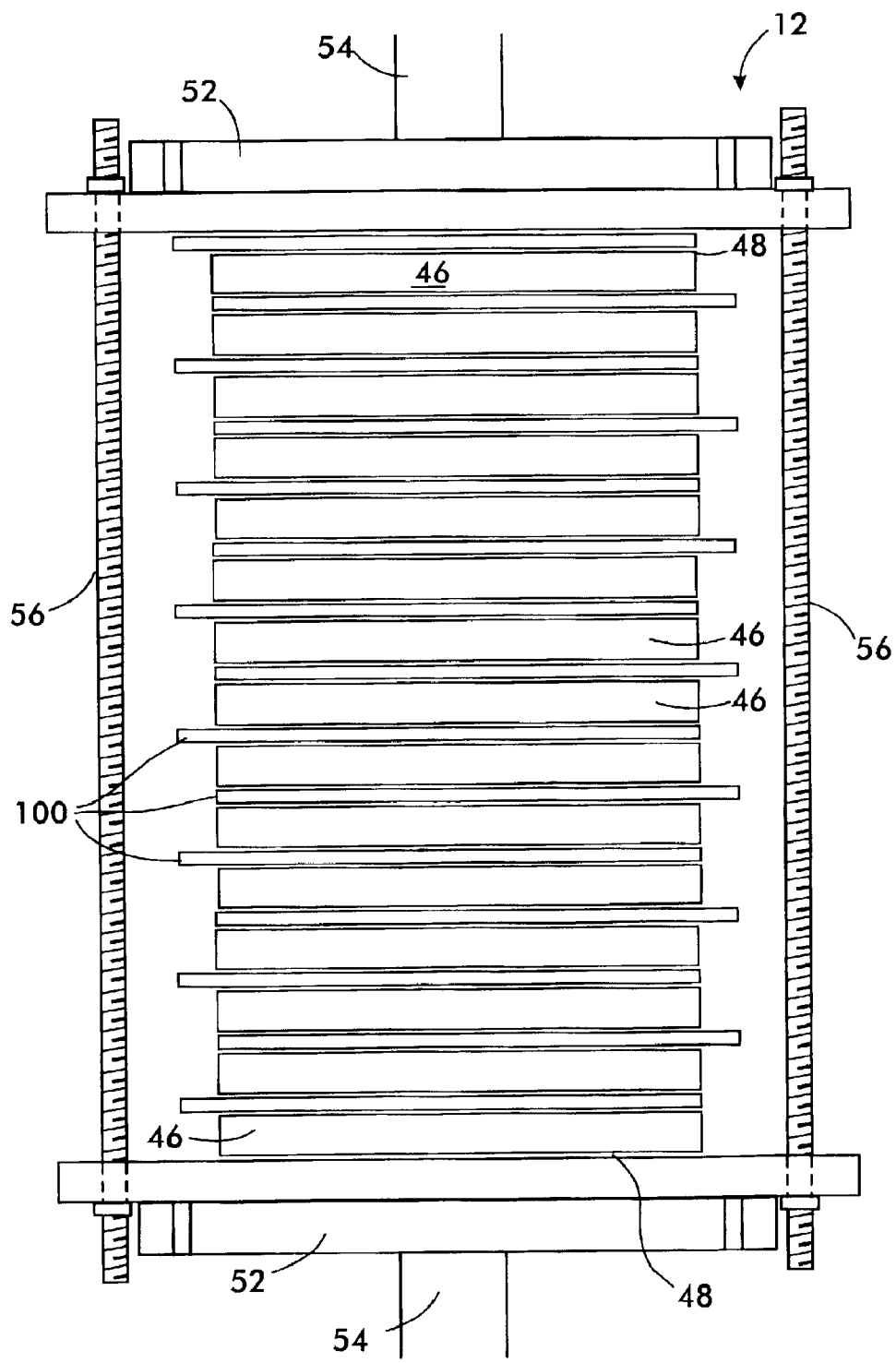
FIG. 4 is a side elevational view of an entire reaction chamber.
Figure 5:
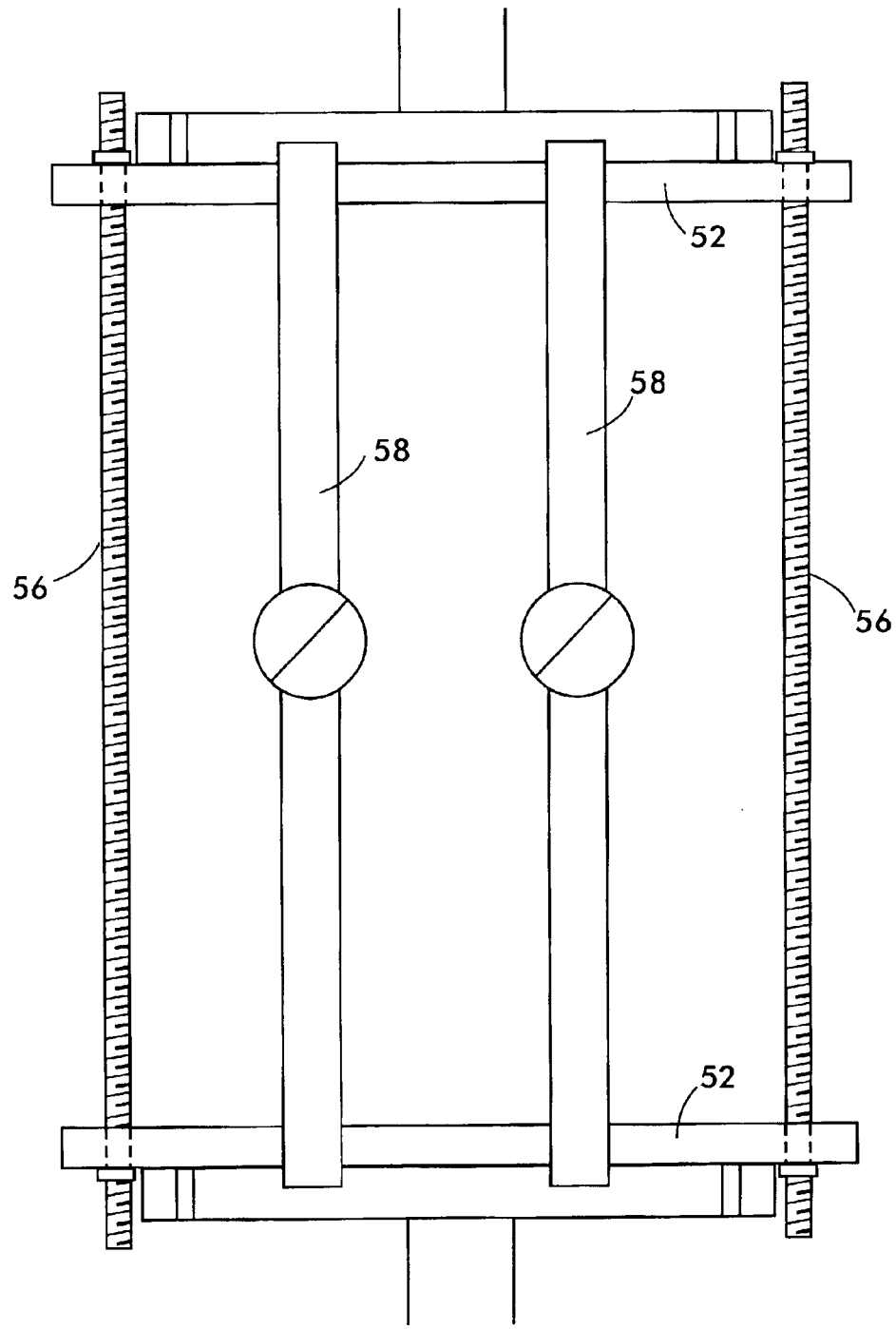
FIG. 5 is a side elevational view of top and bottom pressure plates of a reaction chamber, showing compression members joining the pressure plates.

With reference to FIG. 4, the reaction chamber 12 is formed by a stack of electrode plates arranged between pressure plates 52 on opposite ends. Each electrode is juxtaposed to a gasket on each of its faces, and a spacer 46 is interposed between the gaskets associated with juxtaposed electrodes. In addition, an end gasket 48 and an end spacer 46 are interposed between each of the pressure plates and each end electrode. Elongated compression members 56 join the pressure plates and allow them to be drawn toward each other to compress the gaskets. With reference to FIG. 5, the assembled reaction chamber may include bolts or tightening rods 56 at each corner of the pressure plates. Alternate compression members such as cam-locking rods 58 may be located at one or more locations intermediate the corners.

Figure 6:
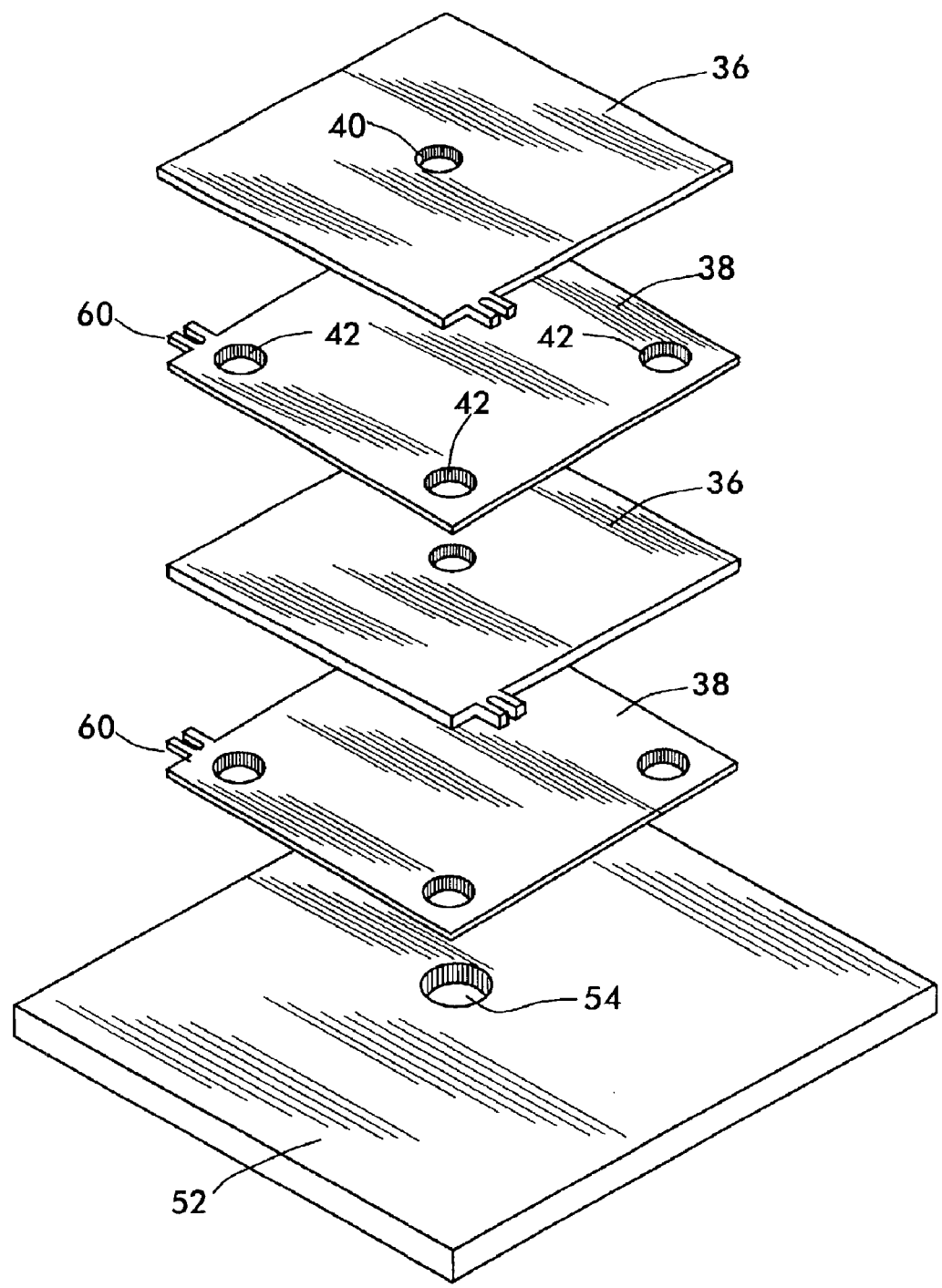
FIG. 6 is a simplified exploded view of a portion of a reaction chamber, showing the alternating placement of electrode plates.

With reference to FIG. 6, the electrode plates in the stack are arranged with group one and group two plates in alternating positions, with the electrical connecting ears in alternating directions. This eases connection of one electrical pole, such as the positive pole, to every other plate, such as all of the group one plates. The opposite pole, such as the negative pole, is connected to all group two plates. The pressure plates 52 are provided with a fitting or connecting nipple 54 for an inlet or outlet to the reaction chamber.

Figure 7:
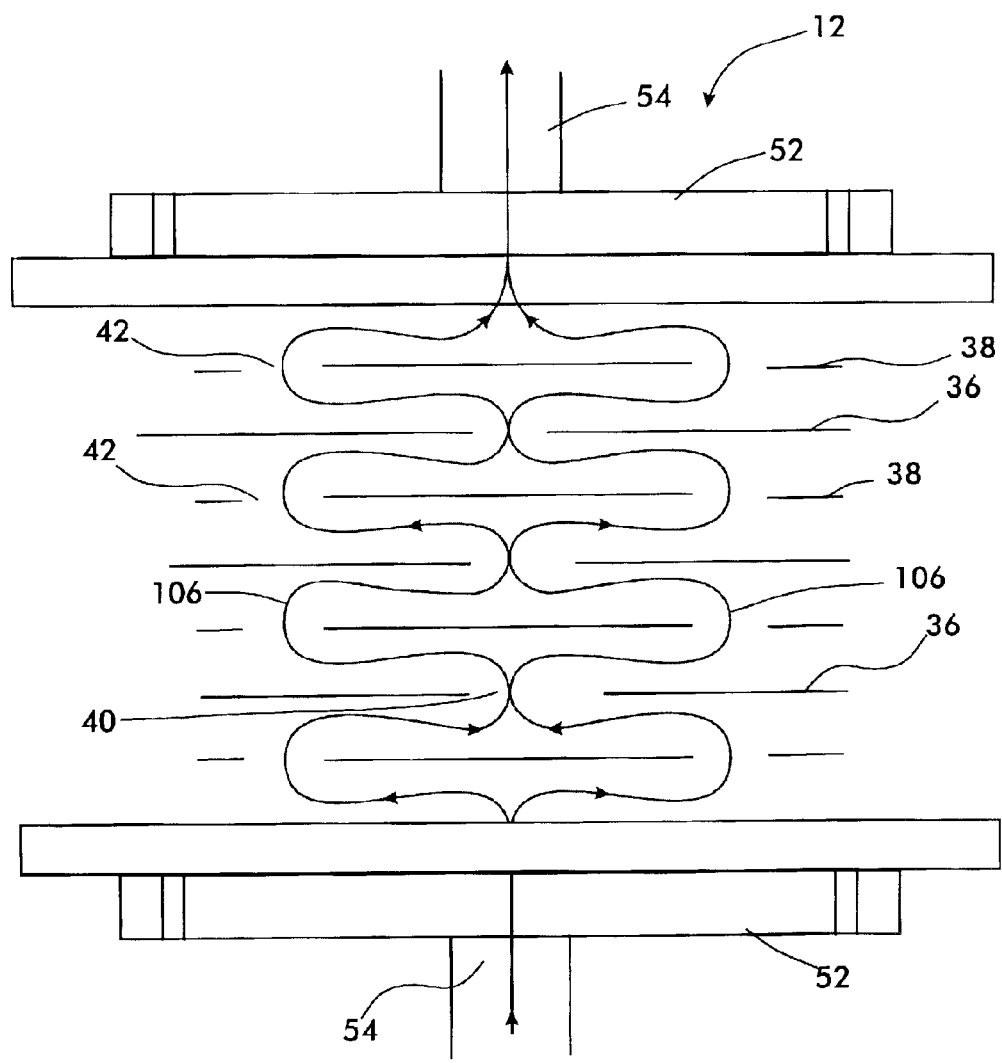
FIG. 7 is a schematic view of the liquid flow path through a reaction chamber.

With reference to FIG. 7, the flow path through the reaction chamber 12 is sinuous. Liquid entering the chamber through one end is directed sequentially through alternating electrodes of groups one and two, in whatever order is selected during assembly of the chamber. The liquid follows a flow path 106 that variously diverges and converges as its traverses each treatment zone, as defined between two juxtaposed electrode plates.

Figure 8:
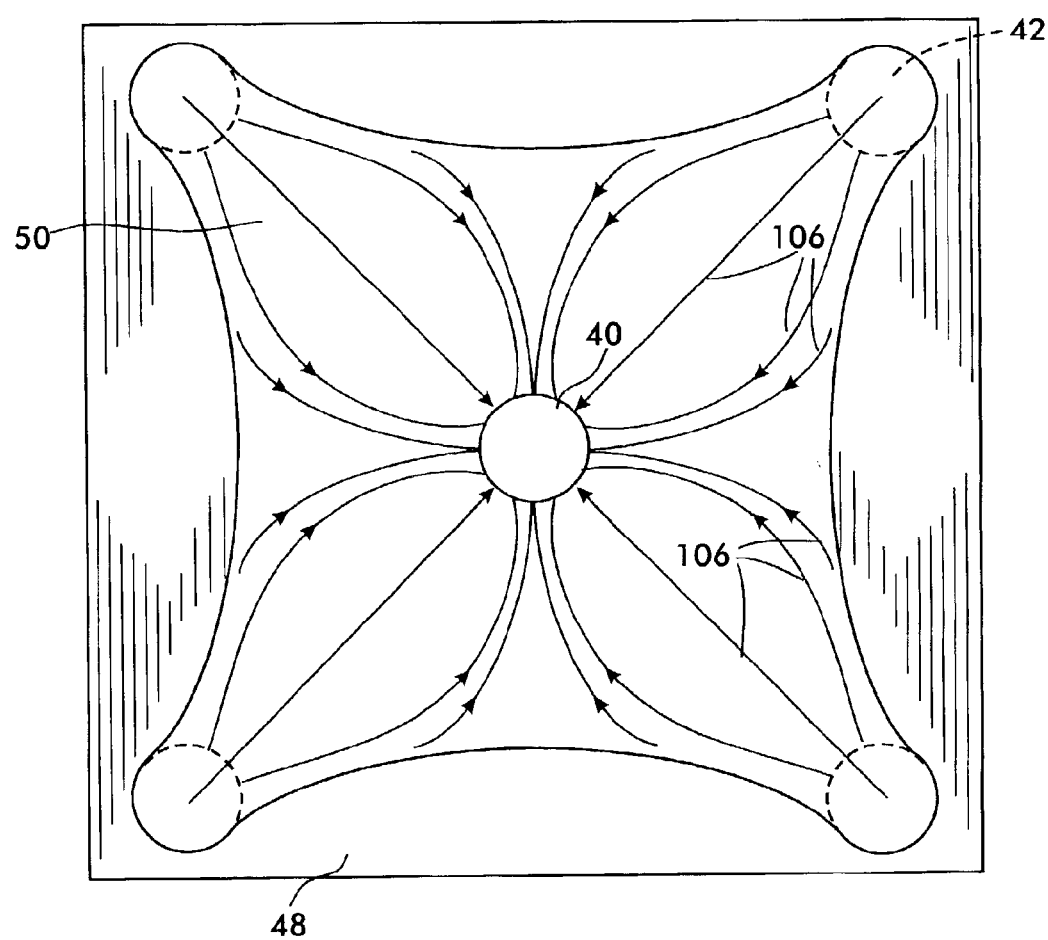
FIG. 8 is a schematic view of the liquid flow path through a single treatment chamber or zone within a reaction chamber, showing the four corner apertures in one of the bordering electrode plates in dashed outline and showing the central aperture of a second bordering electrode plate in solid outline.

With reference to FIG. 8, the flow within each zone is represented by the arrows 106. This flow is turbulent due to the varying contour of the zone. The liquid changes velocity frequently. For example, in passing through the four apertures 42 of a group two plate, the liquid sees an overall large passageway represented by the areas of the four apertures. The liquid can flow relatively slowly through such a large portal. However, when subsequently passing through the single aperture 40 of the juxtaposed group one plate, the liquid sees a relatively small portal represented by the area of the single aperture. The liquid must flow relatively faster through the smaller portal. Additional velocity changes result as the liquid passes from the narrow portions of a single zone to a wider portion, or vice versa. This turbulent flow improves the efficiency of the electrocoagulation process and helps to clean the electrode surfaces of accumulated precipitates or floc.

Figure 9:
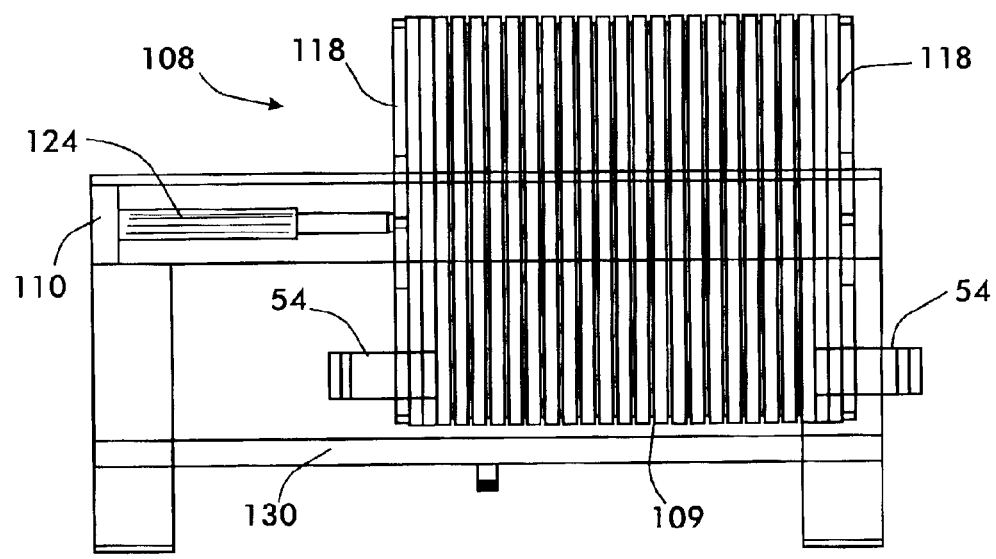
FIG. 9 is a schematic side view of a modified embodiment of a reaction chamber.
Figure 10:
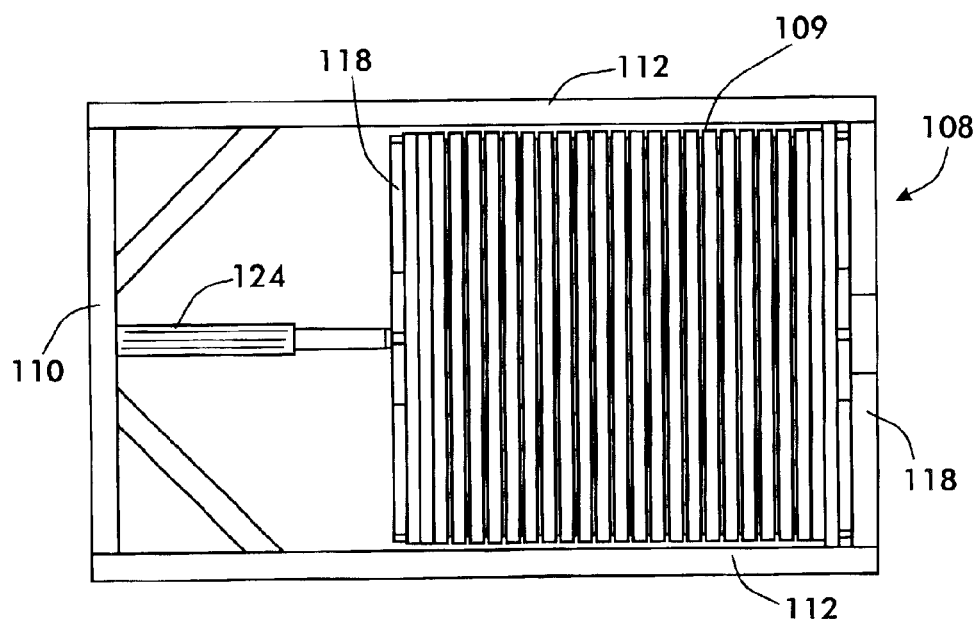
FIG. 10 is a schematic top view of the reaction chamber of FIG. 9.
Figure 13:
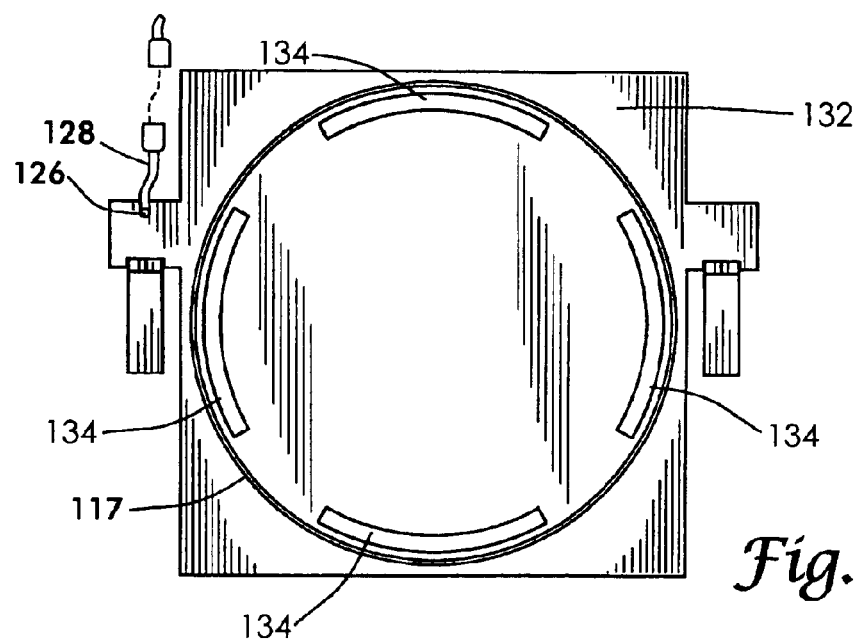
FIG. 13 is a side elevational view of an electrode plate with peripheral apertures, resting on dielectric rails, and showing the position of a juxtaposed O-ring seal in the electrode stack.
Figure 14:
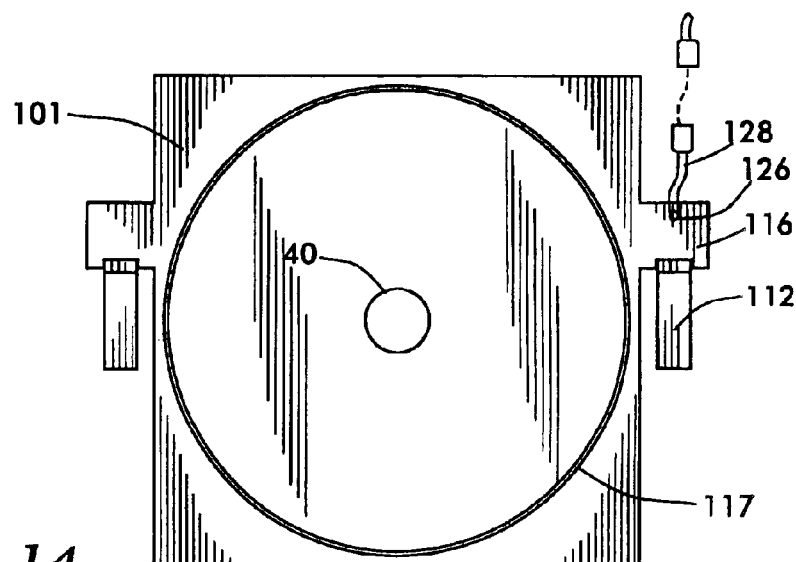
FIG. 14 is a side elevational view of an electrode plate with a single central aperture, resting on dielectric rails, and showing the relative position of a juxtaposed O-ring seal in the electrode stack.

Another preferred embodiment is shown in FIGS. 9 and 10, in which a desirable reaction chamber 108 allows the number of blades or electrode plates in the electrode stack 109 to be varied. It also allows the electrode plates to be removed and reinstalled for cleaning or replacement in a simple and efficient manner. This chamber is constructed with a filter-press type of design using a frame 110 that supports a pair of spaced apart, generally horizontal, longitudinal, dielectric rails 112. Typically a rail is constructed of metal and carries an electrically insulating wear strip or other dielectric covering 114 at all contact areas with an electrode plate. The rails are well suited to support easily fabricated, square electrode plates 101, 132, as shown in FIGS. 13 and 14. The plates include laterally extending ears 116 that overlie the rails and support each plate on the rails by gravity. In addition, the ears 116 serve as supporting rail guides that allow the plates to be positioned by sliding on the rails. The rail guides 116 may have a recess or hooked shape opening to the bottom side for engaging a rail and sliding on the rail when pushed longitudinally.

The frame supports a pair of spaced apart pressure plates 118 that rest on rails 112 and serve as the opposing end plates for the intermediate electrode stack 109 of reaction chamber 108. A supporting ear or rail guide 116 extends from each lateral side of plates 118 in a suitable position for engaging the rails 112. One of the pressure plates 118 is a stationary end plate located at one longitudinal end of the rails 112, such as the right hand end in the view of FIGS. 9 and 10. The stationary plate 118 is lodged against an end of frame 110, which supports the stationary plate against movement. A second pressure plate 118, at the left end of the reaction chamber in the view of FIGS. 9 and 10, may be regarded as a moveable plate. The second plate 118 can be selectively pressed against the juxtaposed end of the electrode stack, pushing the stack against the stationary plate and, thus, sealing it. When pressure through the moveable plate is released, the electrode stack can be spread apart along the rails, and any component can be lifted from the dielectric rails, such as for maintenance or replacement.

Figure 11:
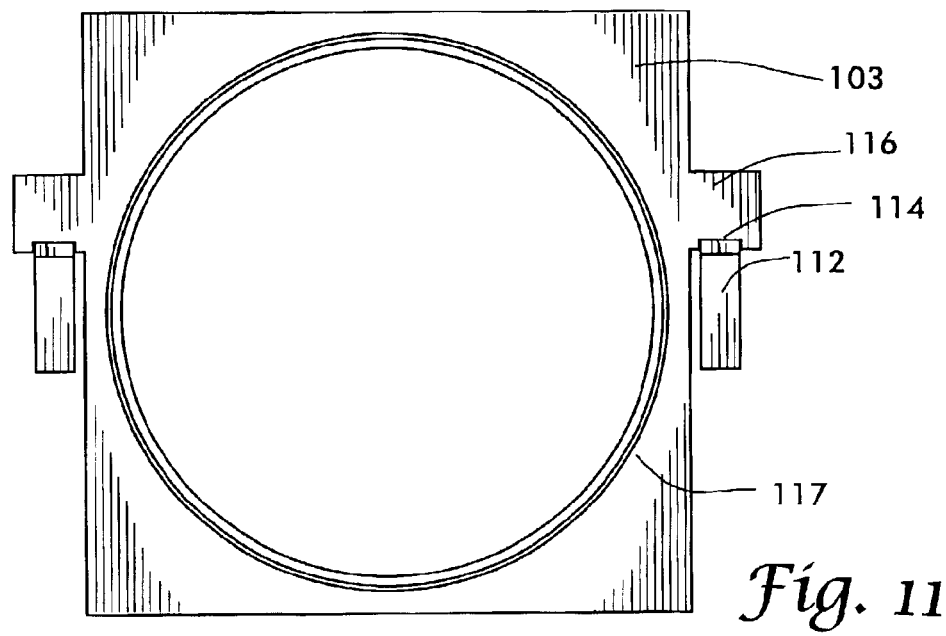
FIG. 11 is a side elevational view of an end plate, showing an external side.
Figure 12:
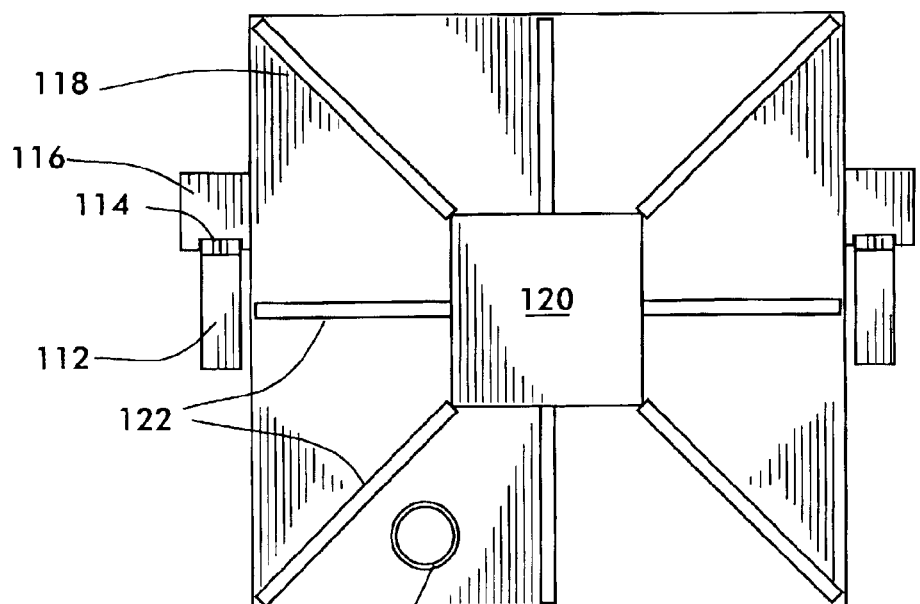
FIG. 12 is a side elevational view of a spacer resting on dielectric rails.

With reference to FIG. 11, the external face of pressure plate 118 is configured to allow a central force on the plate to seal the electrode stack. A force dissipating pad 120 at the center of plate 118 provides a thickened contact area. A plurality of gussets 122 radiate from pad 120 and extend to the periphery of the plate. The plate may carry an inlet or outlet fitting 54. The pad and gusset structure prevents the plate from warping or deforming when a central pressure is applied on pad 120.

A compression means or device selectively pushes the moveable plate 118 against the electrode stack, sealing it against leakage and allowing pressurized operation. The compression device also selectively releases the pressure to allow electrode plates 101, 132 to be removed for maintenance or replacement. A preferred compression device is a fluid operated piston cylinder, operable between an extended position and a retracted position. A pneumatic or hydraulic powered cylinder 124 is suitable. The cylinder 124 acts between the left end of frame 110 and moveable plate 118 on the left side of the electrode stack in the view of FIGS. 9 and 10. The hydraulic cylinder can work over a range of extension, allowing the number of electrode plates in the electrode stack to be varied. One end of the cylinder 124 may be connected to the frame 110, and the cylinder is positioned for the opposite end to contact the nearer end plate 118 when the cylinder is extended, to compress the electrode stack.

The electrode plates used in reaction chamber 108 provide turbulent flow of the process liquid, flowing through a flow path defined by alternating group one and group two plates. In this embodiment, the electrode plates include supporting rail guides 116 for carrying the electrode plates on the rails 112. Each pair of electrode plates is separated by a spacer that also includes rail guides 116. FIG. 11 shows a modified spacer 103 defining a central spacer opening, preferably with a round edge profile defining a circular opening of predetermined diameter. The spacer may carry a compressible seal at each face. Thus, both faces of the spacer 103 may define a retaining groove that carries an O-ring seal 117 juxtaposed to the edge of the central opening. The O-ring seal on each face of the spacer substitutes for a gasket 48. The spacer is formed of a dielectric material. The thickness of a spacer can be selected to establish a desired spacing between blades.

A single treatment chamber may be regarded as including a central spacer with a group one plate on one face and a group two plate on the opposite face. As shown in FIG. 14, the group one plate 101 defines a central aperture 40, preferably round, that is smaller than the central spacer opening. The diameter of aperture 40 preferably is about twenty percent or less of the diameter of the central spacer opening. Plate 101 includes lateral rail guides 116 capable of supporting the plate 101 from rails 112. The plate may include an electrical connecting ear allowing connection to an electric power source 20, although one of the rail guides 116 may be adapted to serve this additional function. Preferably, the rail guide serving as a connecting ear is provided with an attachment point such as hole 126 suited for connection to an electrical connecting lug and wire pigtail 128.

A modified group two electrode plate 132 is used on the opposite side of the spacer. As shown in FIG. 13, the modified plate 132 has peripheral apertures 134 configured as arcs of a peripheral circular slot. The outer edge of the arcuate apertures lies closely within the diameter of the O-ring seal 117 so that the slot is radially juxtaposed to the central spacer opening. A minimal peripheral area of plate 132 is exposed to process liquid outside the position of slot 134 to abate fouling. The slot 134 is discontinuous as necessary to support the central portion of plate 132. For example, the central, disk-shaped portion may be connected to the peripheral portion of the plate at one or more connecting areas. The connections should be as narrow as practical, with the typical arc of such a connection being about fifteen degrees. Thus, if four connecting areas are used, as shown in FIG. 13, the slot 134 will extend over about three hundred degrees, and the connecting areas will extend over about sixty degrees. The electrode plate 132 includes a connecting ear or lug attachment point 126 as previously described.

The cumulative area of apertures 134 is smaller than the size of the central spacer opening but larger than size of the opening 40 in plate 101. For example, the height or radial dimension of the arcuate slot can be about 13 mm (0.5 in) relative to a diameter of about 25.4 cm (10 in) for the central spacer opening. Process liquid is maintained in turbulent flow along the flow path passing through the differently sized openings 40 and 124. The turbulence is encouraged by the non-linear flow path and by differing areas of the apertures in juxtaposed plates.

Electrical power is easily applied or removed from the plates of the reaction chamber 108. In one desirable arrangement, plates 101 may be arranged on dielectric rails 112 with the connecting points 126 all on one side of the chamber, while plates 132 are arranged with point 126 on the opposite side of the chamber. Positive connections may be applied to one side, while negative connections are applied to the other. Lugs and wire pigtails 128 may carry waterproof twist plugs, often referred to as CAM connectors, that allow rapid connection or disconnection of each plate from the DC power supply 20.

The operation of the reaction chamber in FIGS. 9 and 10 is streamlined and requires a minimum of maintenance labor. The reaction chamber is assembled by setting in place a desired sequence of spacers, group one plates, and group two plates on the dielectric rails 112 between the opposite end plates 118. Typically a spacer is juxtaposed to each end plate. A series of reaction zones is established, starting at one end, by adding a plate selected from one of the two groups, followed by another spacer, followed by a plate from the other group. The connecting points 126 of the two groups of plates should be positioned in a sensible way for the planned polarity of each blade, such as respectively right and left. The sequence is repeated as desired within the available length of the rails, terminating at the spacer juxtaposed to the opposite end plate.

When the hydraulic cylinder 124 is applied to compress the electrode stack, the plates and spacers move together by sliding on the rails. The stack is self-aligning. The O-ring seals produce a pressure-tight reaction chamber, enabling the process liquid to be pumped into or out of the chamber. Electricity can be connected to the plates via the pigtails either before or after the stack is compressed. Numerous patterns of electrical connection are possible. For example, power can be applied to first and last blades, or the electrode stack can be subdivided into multiple chambers. Regardless of what connection scheme is used, an advantage of reaction chamber 108 is that all electrical wiring is external of the flow path and protected by the pressurized nature of the chamber from exposure to liquid. A protective cover is applied over the electrode stack, extending at least as low as the rail guides. The wiring harness is housed above the electrical connections of the blades so that it can remain dry even when the electrode stack is opened.

The flow of process liquid through the reaction chamber will follow the flow path established by the chosen sequence of plates and spacers. Inlet and outlet fittings 54 are provided through the end plates 118. The fitting 54 serving as the inlet may contain a mixing tube to create initial turbulence in the process liquid. This turbulence is maintained by the sinuous flow path and changing velocities required by offset positions and varying sizes of the passages through plates 101 and 132.

Opening the electrode stack for cleaning is equally streamlined. The hydraulic cylinder is withdrawn, whereupon the moveable end plate, spacers, and electrode plates can be spread freely on the rails. A catch pan 130 can be carried on the frame 110 below the rails to catch residual liquid from the opened chamber. This pan may be connected through a valve and hose to a drain, or captured liquid may be returned to the untreated process liquid.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be regarded as falling within the scope of the invention as defined by the claims that follow.

What is claimed is:

1. In an electrocoagulation reaction chamber for the electrolytic treatment of a stream of process liquid, having a supporting frame providing a pair of laterally spaced, longitudinally extending, dielectric rails for supporting an electrode stack; first and second spaced apart end plates that are carried by said supporting frame; an electrode stack that is located between said end plates and that defines a flow path therethrough for process liquid, formed of at least: a dielectric spacer that is supported on said rails and which defines a central spacer opening that forms a portion of the flow path; first and second electrode plates that are supported on the rails, wherein said first electrode plate is positioned between the first end plate and said spacer, and said second electrode plate is positioned between the second end plate and the spacer; and wherein one of said electrode plates defines a central electrode aperture that is positioned centrally relative to the central spacer opening and forms a portion of the flow path; and the other of the electrode plates defines a plurality of spaced apart peripheral electrode apertures that are positioned peripherally relative to the central spacer opening and form a portion of a flow path; a compression means for selectively applying or releasing a compressive force on the end plates for selectively applying compression to said electrode stack or releasing compression from the electrode stack; an inlet means for supplying process liquid into a first end of the flow path; and an outlet means for discharging process liquid from a second end of the flow path, the improvement comprising:

said central spacer opening of said dielectric spacer is formed of a plurality of trough portions and crest portions, wherein a trough portion is juxtaposed to each of a plurality of said peripheral electrode apertures, and trough portions at neighboring peripheral electrode apertures are separated by a crest portion.

2. The electrocoagulation chamber of claim 1, wherein each said peripheral electrode are juxtaposed to a troughed edge of said central spacer opening.

3. The electrocoagulation chamber of claim 2, wherein each of said troughed edges of the central spacer opening is concave to said juxtaposed peripheral electrode aperture.

4. The electrocoagulation chamber of claim 1, wherein said peripheral electrode apertures are arcuate.

5. The electrocoagulation chamber of claim 4, wherein said plurality of peripheral electrode apertures are radially juxtaposed to said central spacer opening.

6. The electrocoagulation chamber of claim 1, further comprising:
- an electrical connection ear extending laterally of said first electrode plate;
- a waterproof, selectively connectable and disconnectable wire connector joined to said connection ear; and
- a DC power source connected at one pole to said waterproof wire connector.

7. An electrocoagulation reaction chamber for the electrolytic treatment of a stream of process liquid, comprising:
- a supporting frame providing a pair of laterally spaced, longitudinally extending, dielectric rails for supporting an electrode stack;
- first and second spaced apart end plates that are carried by said supporting frame;
- an electrode stack that is located between said end plates and that defines a flow path
- therethrough for process liquid, formed of at least:
  - a dielectric spacer that is supported on said rails and which defines a central spacer opening that forms a portion of the flow path;
  - first and second electrode plates that are supported on the rails, wherein said first electrode plate is positioned between the first end plate and said spacer, and said second electrode plate is positioned between the second end plate and the spacer; and
  - wherein one of said electrode plates defines a central electrode aperture that is positioned centrally relative to the central spacer opening and forms a portion of the flow path; and the other of the electrode plates defines a peripheral electrode aperture that is positioned peripherally relative to the central spacer opening and forms a portion of a flow path;
- a compression means for selectively applying or releasing a compressive force on the end plates for selectively applying compression to said electrode stack or releasing compression from the electrode stack;
- an inlet means for supplying process liquid into a first end of the flow path;
- an outlet means for discharging process liquid from a second end of the flow path;
- an electrical connection ear extending laterally of said first electrode plate;
- a waterproof, selectively connectable and disconnectable wire connector joined to said connection ear; and
- a DC power source connected at one pole to said waterproof wire connector.

* * * * *